Feb. 4, 1969 R. H. BEVILLE ET AL 3,425,609

TAPE CARTRIDGE DECK

Filed Jan. 6, 1967 Sheet 1 of 3

INVENTORS
ROSS H. BEVILLE
WAYNE E. SCHOBER

BY Semmes & Semmes
ATTORNEYS

INVENTORS
ROSS H. BEVILLE
WAYNE E. SCHOBER

BY Semmes & Semmes
ATTORNEYS

TAPE CARTRIDGE DECK

Filed Jan. 6, 1967

INVENTORS
ROSS H. BEVILLE
WAYNE E. SCHOBER

BY Semmes & Semmes
ATTORNEYS

United States Patent Office 3,425,609
Patented Feb. 4, 1969

3,425,609
TAPE CARTRIDGE DECK
Ross H. Beville, Bethesda, Md., and Wayne E. Schober, Minneapolis, Minn., assignors to Broadcast Electronics, Inc., Silver Spring, Md., a corporation of Maryland
Filed Jan. 6, 1967, Ser. No. 608,481
U.S. Cl. 226—90 7 Claims
Int. Cl. G03b *1/56*; B65h *17/18*

ABSTRACT OF THE DISCLOSURE

This specification discloses a mechanism for moving a pinch roller into contact with a capstan on a tape deck. The pinch roller is first rotated through an arc to a position in parallel with the capstan axis, and then in a direction perpendicular to the capstan axis and into contact therewith.

The present invention relates generally to an endless loop magnetic tape cartridge recording and reproducing system and more particularly to a novel method permitting movement of the pinch roller into contact with the tape and capstan so that the pinch roller strikes squarely against the capstan. In connection therewith, technique for precisely adjusting the pressure between pinch roller and capstan while ensuring precise alignment of pinch roller with respect to capstan and tape also constitutes an important part of this invention. Finally, provision is made for precisely positioning and locking the pinch roller in the same plane as the capstan so that straight forward movement of the pinch roller results in perfect alignment with the capstan.

Accordingly, an object of the present invention is to permit a tape cartridge pinch roller to move forward against a capstan in perfect alignment against the tape and capstan, rather than arcuately as presently practiced in the art.

Another object of the present invention is to permit the precise adjustment of pressure exerted by pinch roller on tape and capstan.

Still a further object of the present invention is to ensure that the pinch roller is precisely and continuously held in position in perfect alignment with the capstan immediately before and during its movement into contact with the tape and capstan.

Other objects of the present invention will become apparent from the ensuing specification and attached drawings, wherein.

Figure 5:
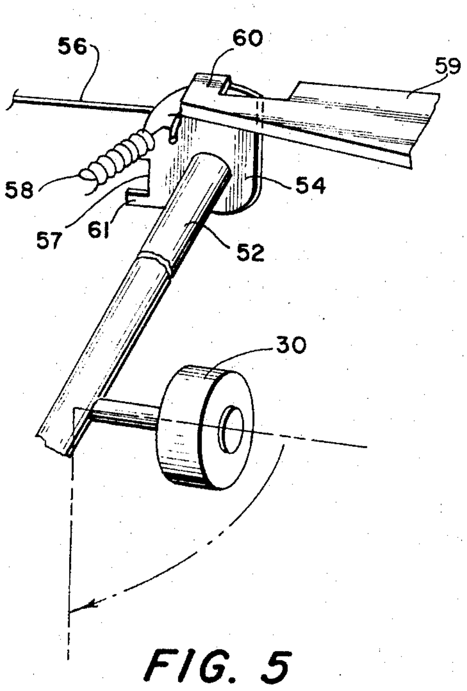
Figure 6:
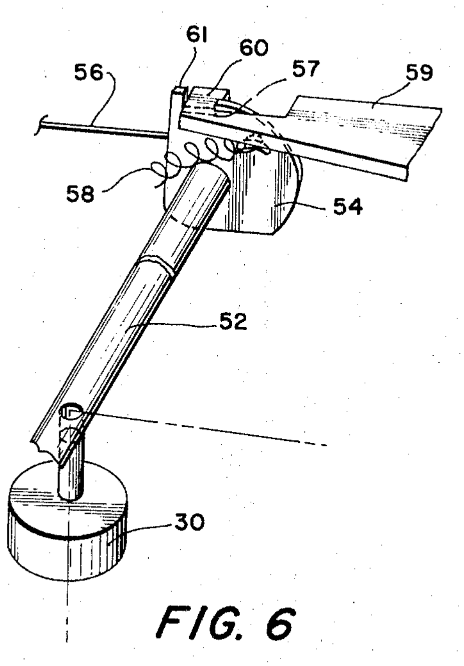

FIG. 5 is a perspective view of a portion of the bottom of tape deck illustrating the position of the pinch roller, its shaft, cam and associated latch before the tape cartridge is inserted within the deck; and FIG. 6 is a perspective view of a portion of the bottom of tape deck after the cartridge has been inserted within deck, illustrating particularly the technique for ensuring precise alignment of pinch roller with capstan.

Figure 1:
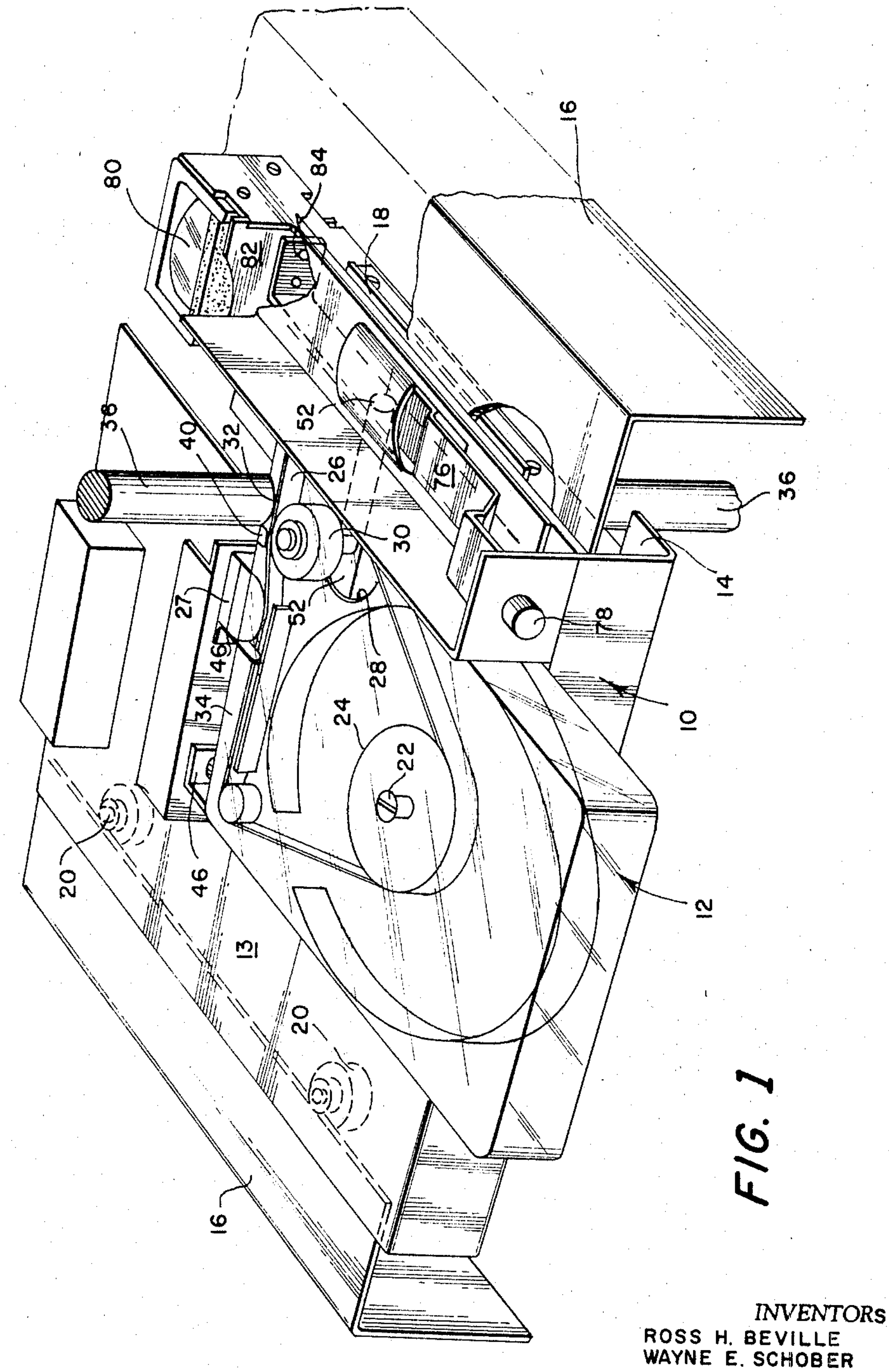
FIG. 1 is a perspective view illustrating a single tape cartridge deck and corresponding tape cartridge in position with the pinch roller aligned preparatory to forward movement into driving relationship with respect to tape and rotating capstan.

As seen in FIG. 1, the components of the present invention include generally a tape deck 10 and tape cartridge 12. More particularly, tape deck 10 includes a top wall 13 terminating forwardly in a generally U-shaped flange 14. As illustrated, tape deck 10 is designed to slide into position within the tape handling machine between guides 16 formed as a part of the housing of the machine. In this respect, the right hand side of tape deck 10 is formed with a slot 18 within which right hand guide 16 fits while spacers 20 permit the left hand side of tape deck 10 to slide with respect to left hand guide member 16.

Tape cartridge 12 includes a shaft 22 which receives a reel 24 having endless magnetic tape 26. Within the right hand, innermost bottom portion of cartridge 12 is located an aperture 28 through which pinch roller 30, described in detail hereinafter, passes. A second opening 32 is located within the end 34 of cartridge 12 to thus expose tape 26 to contact on both sides with pinch roller 30 and capstan 36, respectively, when pinch roller 30 is moved into driving contact therewith. Finally, a transducer head is generally designated by the reference numeral 27.

Figure 2:
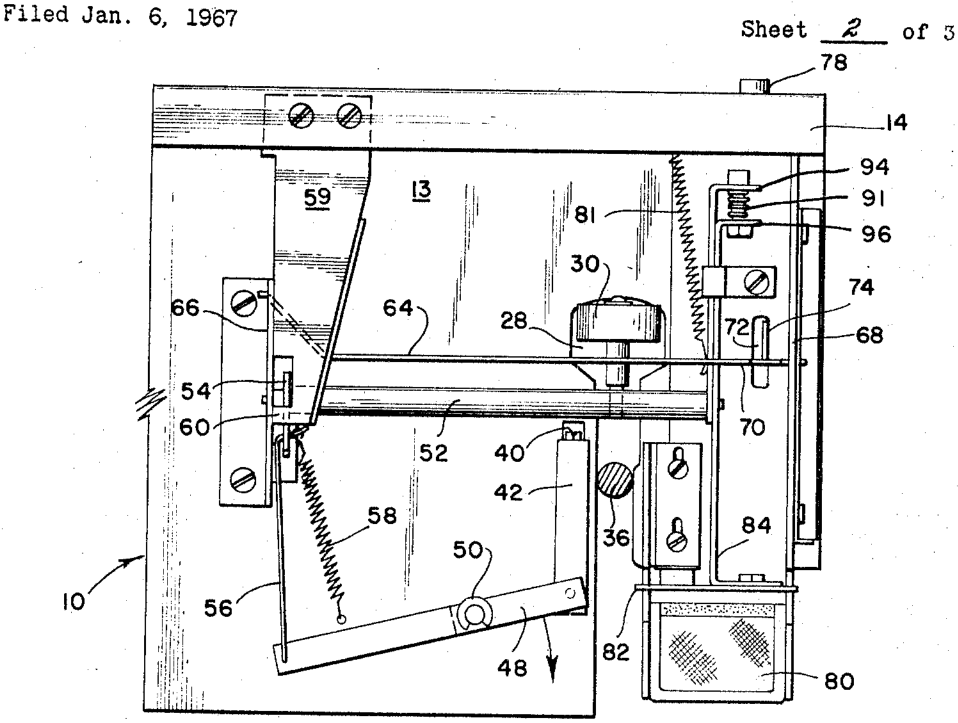
FIG. 2 is a bottom view of tape deck illustrating the position of component parts, particularly the pinch roller, before insertion of tape cartridge.

Before cartridge 12 is inserted within tape deck 10, pinch roller 30 resides in the position illustrated in FIG. 2. As cartridge 12 is slid along top wall 13 of deck 10, the end 34 of cartridge 12 eventually abuts contact 40 (FIG. 1) which is attached to linkage member 42 (FIG. 2) which is permitted to slide along slot 44 (FIGS. 3 and 4) contained in top wall 13. Further sliding of cartridge 12 against contact 40 results in the movement of lever member 48 (FIG. 3) about pivot point 50.

As further seen in FIG. 2, pinch roller 30 is mounted on shaft 52 which terminates at the left hand end thereof in cam 54, the shape of which is illustrated particularly in FIGS. 5 and 6. Connecting cam 54 and the left hand end of lever member 48 is rod 56 such that forward movement of adjustable contact 40 and linkage member 42 results in the counter movement of rod 56, the exact linear distance relationship therebetween being determined by the position of pivot point 50. Importantly, in this manner the distance cartridge 12 must be moved to be placed in "working" relationship with deck 10 and capstan 36 can be adjusted for precise positioning of cam 54 with respect to latch 59 and also ensuring correct alignment of the cartridge, per se. As cam 54 is normally spring biased in the position illustrated in FIGS. 2 and 5 with spring element 58, pinch roller 30 assumes a positive and precise position with respect to capstan 36. However, as the resistance of spring 58 is overcome by the rearward movement of rod 56, shaft 52 and cam 54 rotate through a predetermined angle.

The exact point of termination of rotation of shaft 52 and pinch roller 30 is determined by slot 57 (FIG. 5) within cam 54 and leg 60 of latch 59. That is, latch 59, attached to U-shaped flange 14 and normally resiliently biased against the cam 54 causes leg 60 of latch 59 to latch into slot 57 (FIG. 6). The fact that edge 61 of cam 54 extends beyond the remainder of the surface of cam 54 ensures that leg 60 must drop within slot 57, i.e. the rotation in either direction of cam 54 is abruptly and precisely terminated.

Figure 3:
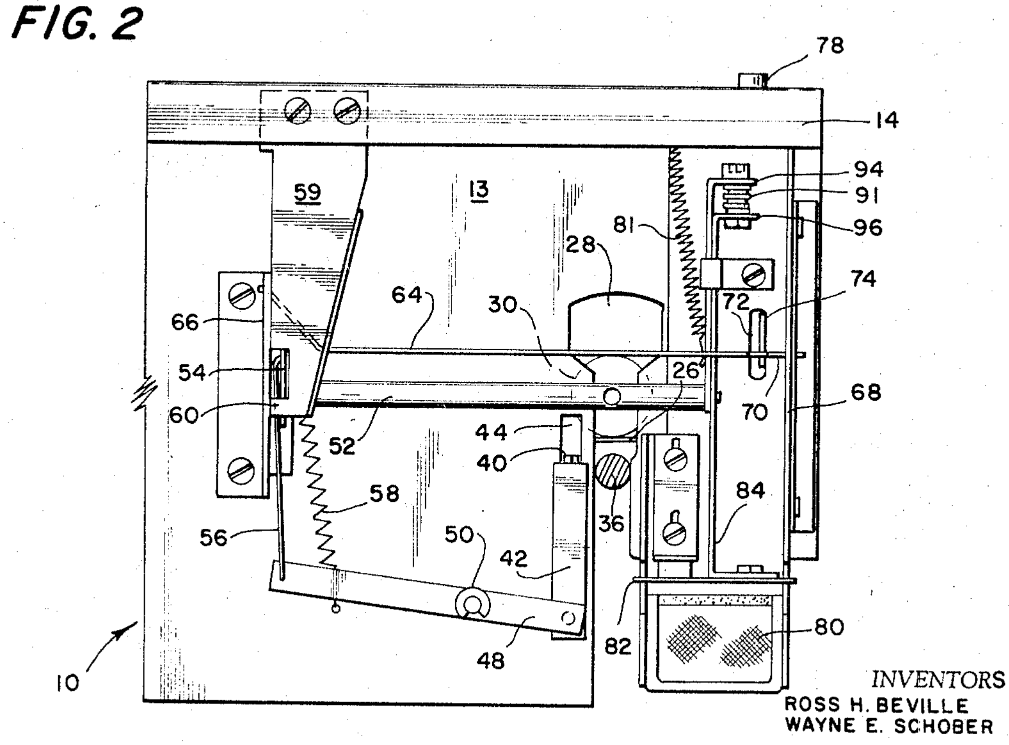
FIG. 3 is a bottom view of the tape deck illustrating the position of component parts, particularly the pinch roller locked in position and in perfect alignment with the rotating capstan.
Figure 4:
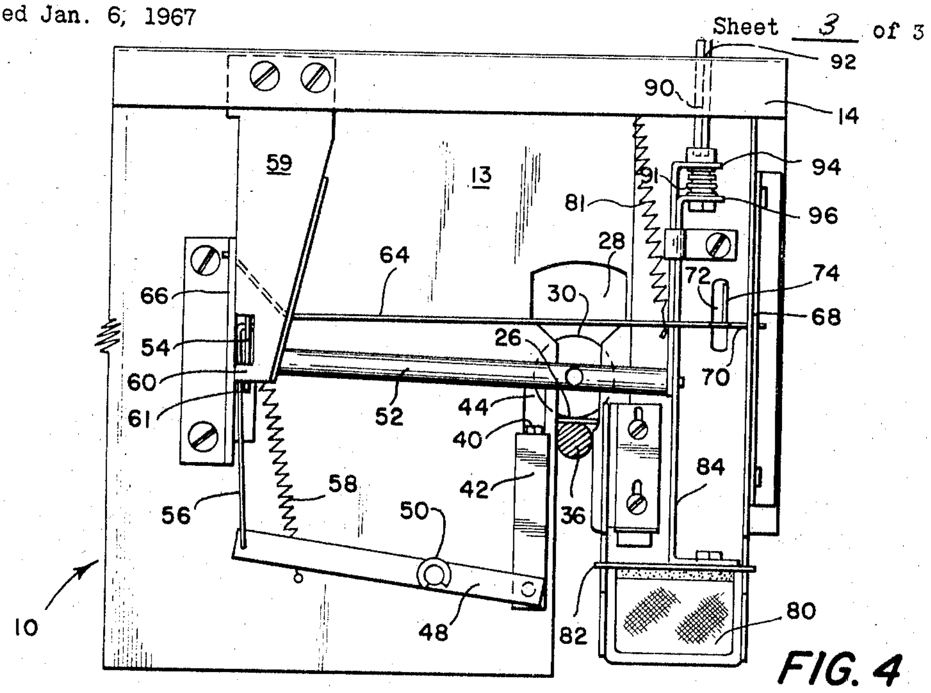
FIG. 4 is a bottom view of the tape deck illustrating the position of component parts after the pinch roller has been moved forward into driving contact with tape and rotating capstan.

As further seen in FIGS. 2–4, a crank rod 64 passes across the bottom of deck 10 and is secured at its left end through plate 66 and at its right end through plate 68. A generally U-shaped bend 70 within rod 64 places this element in close proximity to slot 72 within top wall 13 of deck 10. Bend 70 of crank rod 64 may be rotated and thus the left end of crank rod 64 caused to push upwardly against latch 59 when abutment 74 is pushed downwardly. Of course, abutment 74 is attached to plate 76 (FIG. 1)

slidably mounted within deck 10. As will now be apparent, as button 78 (FIG. 1), secured to plate 76, is pushed inwardly, abutment 74 ((FIG. 3) moves downwardly into contact with U-shaped bend 70 thus moving the left end of crank 64 upwardly forcing leg 60 out of slot 57 after which shaft 52 and pinch roller 30 are returned to their normal horizontal position (FIG. 2) under the influence of spring element 59.

Thus, the axis of pinch roller 30 assumes a position parallel to the axis of the capstan, as seen in FIG. 3, as cartridge 12 is slid into place with deck 10. As can be clearly seen in FIG. 3, at this time pinch roller 30 is not in driving contact with tape 26 and capstan 36, but rather is spaced a predetermined distance therefrom. Now, as solenoid 80 is energized, armature 82 and arm 84 are moved towards solenoid 80 against the resistance of spring 81 and pinch roller 30 fixed to arm 84 through shaft 52, is moved forward into driving contact with tape 26 and rotating capstan 36. In this manner, the movement of pinch roller 30 into driving relationship is horizontal and not arcuate, thus ensuring proper engagement.

Adjustment of the pressure between pinch roller 30 and rotating capstan 36 is accomplished by inserting a wrench 90, as seen in FIG. 4, within the opening 92 of flange 14 to turn bolt 91 adjusting the distance between flanges 94 and 96, flange 94 being stationary with respect to shaft 52 and pinch roller 30 while flange 96 is stationary with respect to plate 82. In this manner, the position of pinch roller 30 with respect to capstan 36 can be varied.

Manifestly, variation in arrangement and configuation of parts may be envisioned without departing from the spirit and scope of invention as defined by the sub-joined claims.

We claim:

1. In an apparatus including a driving capstan and a tape deck within which a cartridge containing endless tape is inserted, the combination with said capstan, deck and cartridge of a pinch roller together mounted on the deck with means for selectively moving said roller into driving contact with a portion of said tape and said driving capstan, said pinch roller being rotated through an arc toward the capstan prior to being moved continuously parallel to said capstan, the axis of the roller being parallel to the axis of said capstan immediately prior to contacting said capstan.

2. An apparatus as in claim 1, including means for moving said pinch roller into position such that its axis is parallel to the axis of said capstan prior to moving said pinch roller into contact with same.

3. An apparatus as in claim 2, wherein said means for moving said pinch roller into position such that its axis is parallel to the axis of said driving capstan is actuated by said cartridge as same is inserted within said tape deck.

4. An apparatus as in claim 3 including both a rotatable pinch roller shaft and adjustable shaft mount secured to the deck, said mount being slidable with respect to the capstan, said shaft and mount being connected to the pinch roller for varying the distance between said driving capstan and pinch roller immediately precedent to contact thereof to establish the desired pressure between pinch roller and capstan.

5. An apparatus as in claim 4, including means mounting said pinch roller thereon, and means fixed to said shaft terminating said moving of said pinch roller and said shaft.

6. An apparatus as in claim 5, wherein said means terminating said moving of said pinch roller includes a member fixed on said shaft, said member being provided with a notch; a corresponding bar capable of fitting within said notch is included; and means acting on said member urging said notch normally into a position of approximately 90° from said bar and means resiliently urging said bar against said member such that as said notch reaches said bar said bar will latch therein preventing further rotation of said shaft.

7. An apparatus as in claim 6, including means determining the distance said cartridge must be moved to move said pinch roller into position such that its axis is parallel to the axis of said driving capstan.

References Cited

UNITED STATES PATENTS 3,137,429 6/1964 Joslow ---------------- 226—176
3,301,564 1/1967 Platt.

ALLEN N. KNOWLES, *Primary Examiner.*

U.S. Cl. X.R.

226—177, 180